Nov. 20, 1951    J. A. RAJCHMAN ET AL    2,575,769
DETECTION OF IONS
Filed Sept. 30, 1948
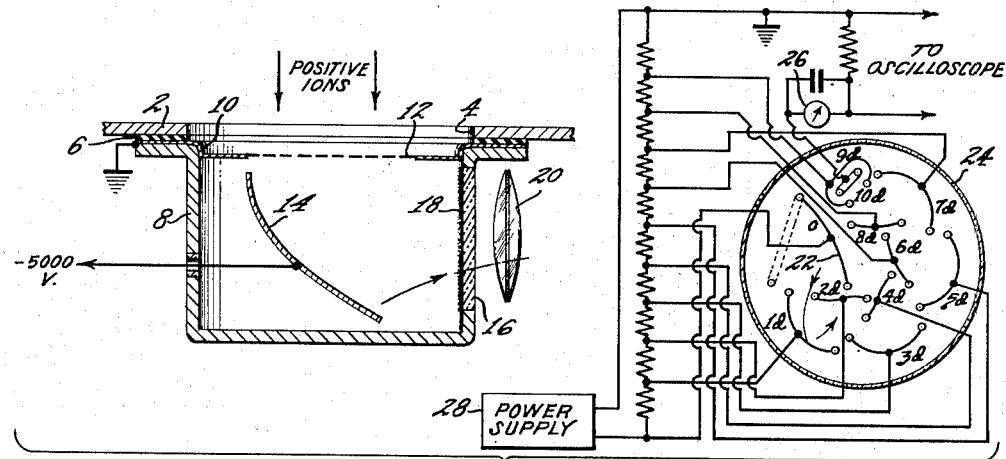
Fig. 1
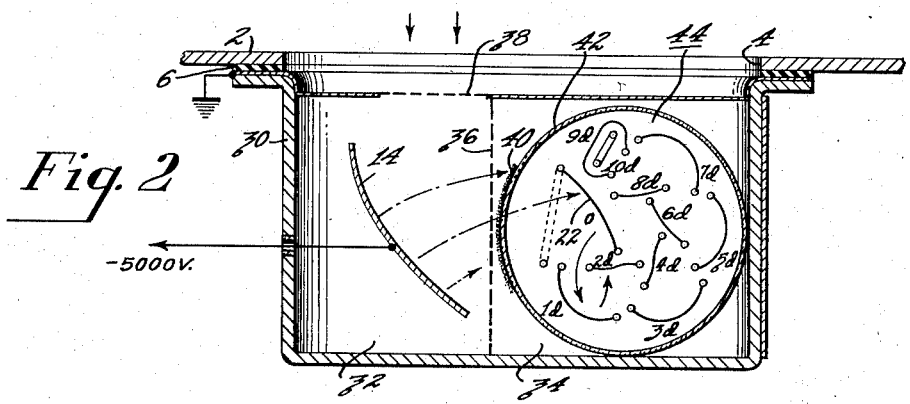
Fig. 2
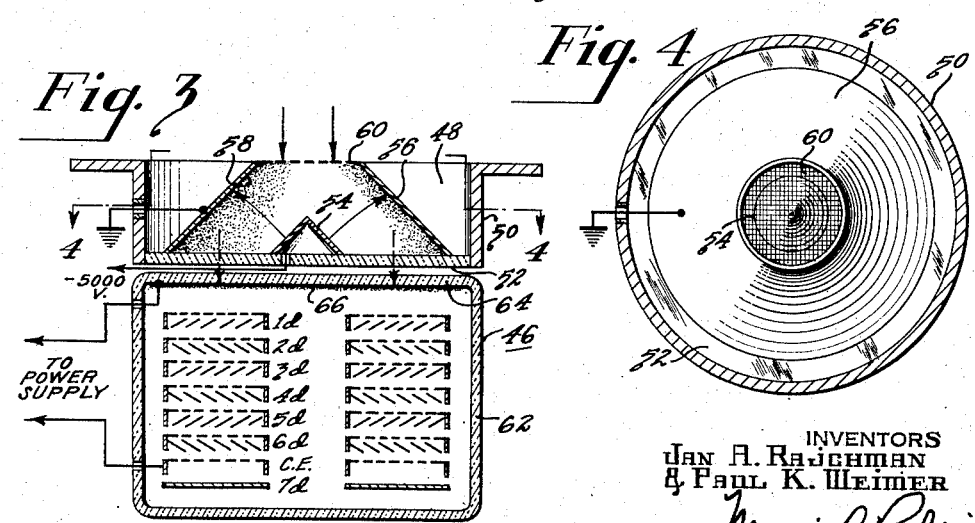
Fig. 3
Fig. 4
INVENTORS
Jan A. Rajchman
& Paul K. Weimer
Morris Rabkin
ATTORNEY Patented Nov. 20, 1951

2,575,769

UNITED STATES PATENT OFFICE 2,575,769

DETECTION OF IONS

Jan A. Rajchman and Paul K. Weimer, Princeton, N. J., assignors to Radio Corporation of America, a corporation of Delaware Application September 30, 1948, Serial No. 52,076

9 Claims. (Cl. 250—71)

1

This invention relates generally to improvements in methods of and apparatus for the detection and the measurement of ion current. More particularly, it relates to improvements in measuring and detecting ion currents where the ions are produced within a vacuum system but in which essential elements of the detecting apparatus are more conveniently and more efficiently located in a different vacuum system.

In many scientific instruments, weak positive ion currents of relatively small energy content must be detected and measured. For example, in the use of a mass spectograph it is frequently desired to detect and measure the ion currents produced by the ions of a rare isotope although these ions may produce only very weak currents. Or, in the use of some types of neutron detectors, positive ions or protons are to be measured, these positive ions or protons being produced by neutron bombardment of a suitable material.

It has previously been suggested that a secondary emission electron multiplier be utilized for the detection of single particles such as ions because of the multiplier's high gain, low residual currents and good signal-to-noise ratio. However, in most methods which have previously been proposed, the multiplier has been positioned within the same vacuum system in which the ions are produced, the ions being made to bombard the first target of the multiplier. The presence of ions in a system of this nature imposes the requirement that a relatively low vacuum be maintained to sustain the ion currents. Furthermore, the system is usually opened to the atmosphere at intervals for the purposes of inserting new specimens, etc.

Multiplier characteristics such as gain and amount of dark current are very sensitive to the degree of vacuum to which the multiplier elements are exposed. In many types of multipliers, such as the 931 series, the photo-sensitive and secondary emissive surfaces are destroyed by exposure to the air so that the delicate activation of the tube would have to be repeated after each opening of the system.

One object of the present invention is to provide improved methods of and apparatus for the detection and measuring of ion currents.

Another object of the invention is to provide improved apparatus including an electron photomultiplier for the detection and measuring of ion currents.

Another object of the invention is to provide novel methods of and apparatus for detecting and measuring ion currents using an electron

2 photo-multiplier having elements housed within a vacuum system which is separate from that in which the ion currents are generated.

Another object of the invention is to provide a novel method of detecting and measuring ion currents by converting the ion currents into electron currents, changing the electron currents into light energy, converting the light energy back into electron currents and detecting the relative intensities of the electron currents.

Still another object of the invention is to provide novel apparatus for detecting and measuring ion currents which apparatus includes means for converting the ion currents into corresponding electron currents.

These and other objects will be more apparent and the invention will be better understood by consideration of the following specification when taken in connection with the drawings of which:

Fig. 1 is a schematic sectional view of one form of apparatus suitable for carrying out the present invention, Fig. 2 is a schematic sectional view of a second embodiment of apparatus suitable for carrying out the invention, Fig. 3 is a sectional view of a third embodiment of apparatus suitable for carrying out the invention, and Fig. 4 is a plan view, partly in section, taken along the line 4—4 of Fig. 3.

Referring more particularly to Fig. 1, there is illustrated the end wall 2 of a system under low vacuum, within which is a source of ions (not shown) the ion current output of which is to be measured. The end wall 2 is provided with a wide central aperture 4 through which the ions may pass.

To the wall surrounding the aperture 4 there is hermetically sealed by means of a gasket 6 a conversion chamber 8 having metal walls and an entrance opening 10 to permit ions to enter from the ion source. Positioned over the entrance of the conversion chamber 8 is a metal grid or screen 12.

The chamber 8 is also provided with a metallic ion target 14 positioned in the path of the ions from the source. The ion target is maintained at a potential several thousand volts negative with respect to the chamber and screen. This may be accomplished by grounding the chamber and screen and connecting the target to a suitable source of negative potential, i. e., −5000 volts.

The ion target is preferably made of a material having the property of high secondary emissivity to positive ion bombardment. For most metals about two electrons are produced per bombarding ion of an energy of several thousand volts. Some metals, such as beryllium-copper alloys, have a ratio as high as 8. This alloy is one of those preferred for the ion target.

The ion target is also preferably curved in a suitable manner in order to focus the stream of electrons leaving its surface.

One of the metal side walls of the conversion chamber 8 is provided with a glass window 16 coated on its inner surface with a cathode-luminescent material 18. For reasons which will be more fully explained it is preferred to use ZnO or another fast decay phosphor as the luminescent material.

The operation of the part of the system thus far described is as follows. Ions from the source enter the conversion chamber through the screen 12 and strike the target 14. The ions bombard the target with an energy equal to their original energy plus the accelerating energy provided by the drop of potential between the screen 12 and the target. The electrons leaving the target are focused, due to the curvature of the target, and are directed upon the luminescent coating 18. Since the electrons have a negative charge, they are accelerated by the same field which accelerated the ions but the acceleration occurs in the opposite direction.

The electrons striking the luminescent material generate a corresponding amount of light energy which passes through the glass window 16, is focused by the lens system 20 and directed upon the photo cathode 22 of the multiplier tube 24. The multiplier tube may have its output connected in series with an ammeter 26 and may also be connected to an oscilloscope (not shown) for detecting and measuring currents of very short duration. The multiplier tube is also connected to a suitable power supply 28 which, in a manner well known in this art, supplies suitable potentials to the tube dynodes through the dropping resistors. The photoelectrons produced by the photo cathode are then multiplied by the successive secondary emission stages of the multiplier tube. The thus amplified electron currents may then be measured by the ammeter or oscilloscope or both.

The conversion efficiency of the luminescent screen 18 may be raised by providing it with a thin coating of aluminum as is now conventionally done in raising the efficiency of cathode ray tube screens. If an aluminum coating is used potentials on the walls of the chamber and on the screen should be of the order of −10,000 volts.

The light which is received by the photo cathode 22 of the photomultiplier tube is more efficient in releasing photoelectrons if the spectral response of the luminescent screen 18 matches that of the photo cathode. A particularly good match for the 931A tube is ZnO, hence the preference for this material in this particular embodiment of the invention.

A second embodiment of the invention requiring fewer parts and somewhat less space is illustrated in Fig. 2. In this embodiment, the conversion chamber 30 is separated into two parts 32 and 34 by means of a screen 36. Ions enter one part of the chamber 32 through a screen 38 and strike the metal target 14 from whence the emitted electrons are directed to a coating of luminescent material 40 placed on the glass envelope 42 of a photomultiplier tube 44 which is positioned in the other compartment 34 of the chamber. The screens 36 and 38 are charged to the same potential with respect to the ion target 14 and the operation is the same as described in connection with the apparatus shown in Fig. 1. Although, in the second embodiment, the multiplier tube is placed within the same vacuum system in which the ions are produced, the multiplier tube remains sealed and its elements are exposed only to the vacuum system within the tube.

A third embodiment of the invention is shown in Figs. 3 and 4. This embodiment utilizes a so-called "pin-wheel" multiplier 46 of the type shown and described in U. S. Patent 2,433,941. Ions from a source (not shown) first enter a conversion chamber 48. This chamber has metal side walls 50 and a glass base 52. On the center of the glass base is positioned a conical shaped metal ion target 54 connected to a source of negative potential and surrounding which is a frusto-conical metal jacket 56 the inside of which is coated with cathode-luminescent material 58. The two bases of the frusto-conical jacket are open although the upper base is provided with a metal screen 60 and the lower base rests upon the glass window 52 of the chamber 48. The coated jacket and the screen are preferably maintained at ground potential.

The photomultiplier tube 46 is provided with a glass jacket 62 having at least one flat surfaced wall 64. The inner side of this wall is provided with a semi-transparent photo cathode 66. The outer side is placed against the bottom window of the chamber 48. Within the jacket of the multiplier tube are a number of "pin-wheel" type dynodes and a collector electrode, designated C. E., characteristic of this type of tube. The cathode and collector electrode have been illustrated as connected to a suitable power supply but it will be understood that the dynodes are also connected to a source of potential in a manner similar to that illustrated in Fig. 1. These connections have been omitted from Fig. 3 for the sake of simplicity and since they form no part of the present invention per se.

In operation, ions strike the ion target 54 which may be maintained at a potential of 5,000–10,000 volts negative with respect to the potential on the screen 60. Electrons emitted by the target strike the phosphor coating 58 generating light which is directed through the glass window 52 and thence through the flat surface 64 of the multiplier jacket to the photocathode 66. Electrons emitted by the photocathode are multiplied by the dynodes in conventional manner.

The screens 12, 38 and 60 at the entrance of the respective ion conversion chambers shield the interior of the vacuum system in which the ions are produced from the field produced by the ion-target electrode.

In all of the embodiments an ion-electron, electron-light and a light-electron link are necessary for the following reasons. The ion-electron conversion is for the purpose of increasing the efficiency of energy conversion. Ions are much less efficient than electrons, having fallen through the same potential drop, in producing light from a fluorescent material and, furthermore, they cause deterioration of the fluorescent material with prolonged bombardment. The triple conversion can be made more efficient than direct bombardment of the first electron multiplier target in addition to permitting more practical and convenient equipment. This increase in efficiency comes about from the energy given to the secondary electrons which are released by the primary electrons. Each of these electrons will produce many photons so that even if some are lost because of the inefficiency of the light gathering system, each photon which strikes the photocathode may release more than one photo electron.

The signal-to-noise ratio is not impaired by the type of conversion described as part of the present invention and may be better than the signal-to-noise ratio in a system where ions are caused to bombard directly the first target of a photo-multiplier where inefficient collection of the electrons may occur.

There has thus been described an improved method of and apparatus for detecting positive ion space currents. The improvement lies in introducing a different system for detecting and measuring the energy in the ion currents by converting the energy into a form which is more readily amplified and which enables apparatus of higher efficiency to be used.

What is claimed is:

1. Apparatus for detecting and measuring ion space currents produced in a partially evacuated chamber comprising means responsive to said ion space currents for producing corresponding electron space currents, means positioned in the path of said electron currents for converting said electron currents into corresponding amounts of light energy, photoelectric means positioned in the path of said light energy for detecting said light energy and producing corresponding amounts of electrical energy, and means for indicating the amounts of said electrical energy.

2. Apparatus according to claim 1 which includes means located within said evacuated chamber for raising the energy level of said ion space currents and of said electron space currents before said electron space currents are converted into light energy.

3. Apparatus according to claim 1 in which said means responsive to ion space currents is a metallic member having secondary emissive properties and in which said means for converting electron space currents into light energy comprises a film of cathode luminescent material.

4. Apparatus according to claim 3 in which said photoelectric means is a photo multiplier having elements enclosed in a vacuum system separate from the chamber in which said ion space currents are produced.

5. A method of detecting ion space currents produced within a system under low vacuum comprising bombarding a secondary emissive target with positive ions, directing the electrons produced by the target onto a surface coated with cathode luminescent material thereby producing a corresponding amount of light energy, transmitting said light energy outside said system, detecting said light energy photoelectrically, and indicating the amount of the thus detected energy.

6. A method of detecting ion space currents produced within a system under low vacuum comprising bombarding a secondary emissive target with positive ions, focusing the electrons produced by the target onto a surface coated with cathode luminescent material thereby producing a corresponding amount of light energy, transmitting said light energy outside said system, detecting said light energy photoelectrically and indicating the amount of the thus detected energy.

7. Apparatus for detecting and measuring ion space currents produced in a partially evacuated chamber comprising a secondary emissive ion target positioned in the path of the ions to be detected, a surface carrying a film of cathode-luminescent material positioned in the path of electrons emitted by said target, means connected to said target for generating an electrical field in the vicinity of said target both for accelerating ions approaching said target and for accelerating electrons emitted by said target, photoelectric means for detecting light energy given off by said cathode-luminescent material, and means for indicating the amount of said detected energy.

8. Apparatus according to claim 7 in which said target is curved in a manner such as to focus the electrons given off by said target into a beam directed at said film.

9. Apparatus according to claim 8 in which said photoelectric means is an electron multiplier having a photosensitive cathode with a spectral response matched to the spectral emission characteristics of said cathode-luminescent material.

JAN A. RAJCHMAN.
PAUL K. WEIMER.

REFERENCES CITED

The following references are of record in the file of this patent:

The Photo-Multiplier Radiation Detector, by Marshall et al., Physical Review, September 15, 1947, page 528.

The Detection of Single Positive Ions, Electrons and Photons by a Secondary Electron Multiplier, by J. S. Allen, May 15, 1939, pp. 966–971.

Secondary Emission from Metals Due to Bombardment of High Speed Positive Ions, by W. J. Jackson, Physical Review, September 1926, pp. 524–530.

Physical Review, vol. 52, 1937, page 583.

The Photomultiplier X-Ray Detector, by Marshall, Coltman and Hunter, Review of Scientific Instruments, July 1947, pp. 504–513.

A Precise Measurement of the Energy Change in the Transmutation of Beryllium into Lithium by Photon Bombardment, by Allison, et al., Physical Review, vol. 54, 1938 pp. 171 and 172.

Solid Fluorescent Materials, by R. P. Johnson, American Journal of Physics, 1940, page 147.